United States Patent
Echemendia et al.

(10) Patent No.: US 12,535,056 B1
(45) Date of Patent: Jan. 27, 2026

(54) WIND TURBINE WITH ADAPTIVE NACELLE

(71) Applicants: Abel Echemendia, Hypoluxo, FL (US); Abel J. Echemendia, Jr., Hypoluxo, FL (US); Daniel S. Echemendia, Hypoluxo, FL (US)

(72) Inventors: Abel Echemendia, Hypoluxo, FL (US); Abel J. Echemendia, Jr., Hypoluxo, FL (US); Daniel S. Echemendia, Hypoluxo, FL (US)

( * ) Notice: Subject to any disclaimer, the term of this patent is extended or adjusted under 35 U.S.C. 154(b) by 70 days.

(21) Appl. No.: 18/624,212

(22) Filed: Apr. 2, 2024

(51) Int. Cl.
*F03D 15/10* (2016.01)
*F03D 9/25* (2016.01)
*H02K 7/116* (2006.01)

(52) U.S. Cl.
CPC ........... *F03D 15/10* (2016.05); *F03D 9/25* (2016.05); *H02K 7/116* (2013.01); *F05B 2220/7068* (2013.01); *F05B 2220/707* (2013.01); *F05B 2260/232* (2013.01); *F05B 2260/4031* (2013.01)

(58) Field of Classification Search
CPC . F03D 15/10; F03D 9/25; H02K 7/116; F05B 2220/7068; F05B 2220/707; F05B 2260/232; F05B 2260/4031
USPC .............................. 290/1 C, 4 A, 4 C, 44, 55
See application file for complete search history.

(56) References Cited

U.S. PATENT DOCUMENTS

| | | | |
|---|---|---|---|
| 3,382,386 A | 5/1968 | Schlaeppi | |
| 6,106,256 A * | 8/2000 | Talaski | F04C 2/084 418/166 |
| 6,541,877 B2 * | 4/2003 | Kim | F03D 7/0272 290/55 |
| 7,218,012 B1 * | 5/2007 | Edenfeld | F03D 9/25 290/55 |
| 7,851,933 B2 * | 12/2010 | Duffey | F16D 43/22 290/40 C |
| 8,067,847 B1 * | 11/2011 | Waszak | H02K 16/04 290/55 |
| 8,622,698 B2 * | 1/2014 | Kristoffersen | F03D 7/024 416/37 |
| 8,662,854 B1 * | 3/2014 | Salaverry | F03D 1/0675 415/914 |
| 2006/0108809 A1 * | 5/2006 | Scalzi | B60L 8/00 290/55 |
| 2008/0149445 A1 * | 6/2008 | Kern | F02C 3/113 192/3.56 |

(Continued)

*Primary Examiner* — Charles Reid, Jr.
(74) *Attorney, Agent, or Firm* — Donald J. Ersler

(57) ABSTRACT

A wind turbine with adaptive nacelle preferably includes a geared blade shaft; and at least one reciprocating generator unit. The geared blade shaft includes a plurality of blade magnets attached to an outer perimeter of the blade shaft, which extend a portion of a length of the blade shaft. Each reciprocating generator unit preferably includes an intermediate magnetic gear, at least one magnetic generator gear, at least one electrical generator, at least one actuator and a retention frame. The intermediate magnetic gear and the at least one generator magnetic gear are pivotally retained in the retention frame. The at least one electrical generator is retained on the retention frame. The at least one actuator is used move the reciprocating generator unit to engage rotation of the geared blade shaft with the intermediate magnetic gear. Rotation of the geared blade shaft causes rotation of the electrical generator.

14 Claims, 9 Drawing Sheets

(56) References Cited

U.S. PATENT DOCUMENTS

| | | | | |
|---|---|---|---|---|
| 2009/0021021 | A1* | 1/2009 | Grenier | F03D 9/25 |
| | | | | 290/55 |
| 2013/0320681 | A1* | 12/2013 | Karmaker | H02K 7/116 |
| | | | | 29/598 |
| 2014/0035287 | A1* | 2/2014 | Smith | F03D 80/70 |
| | | | | 290/55 |
| 2014/0284932 | A1* | 9/2014 | Sharkh | H02K 49/102 |
| | | | | 290/54 |
| 2019/0285141 | A1* | 9/2019 | Ohr | B60K 17/145 |
| 2019/0383359 | A1* | 12/2019 | Tesar | H02K 7/1838 |
| 2023/0238858 | A1* | 7/2023 | White | H02K 7/003 |
| | | | | 310/83 |

* cited by examiner

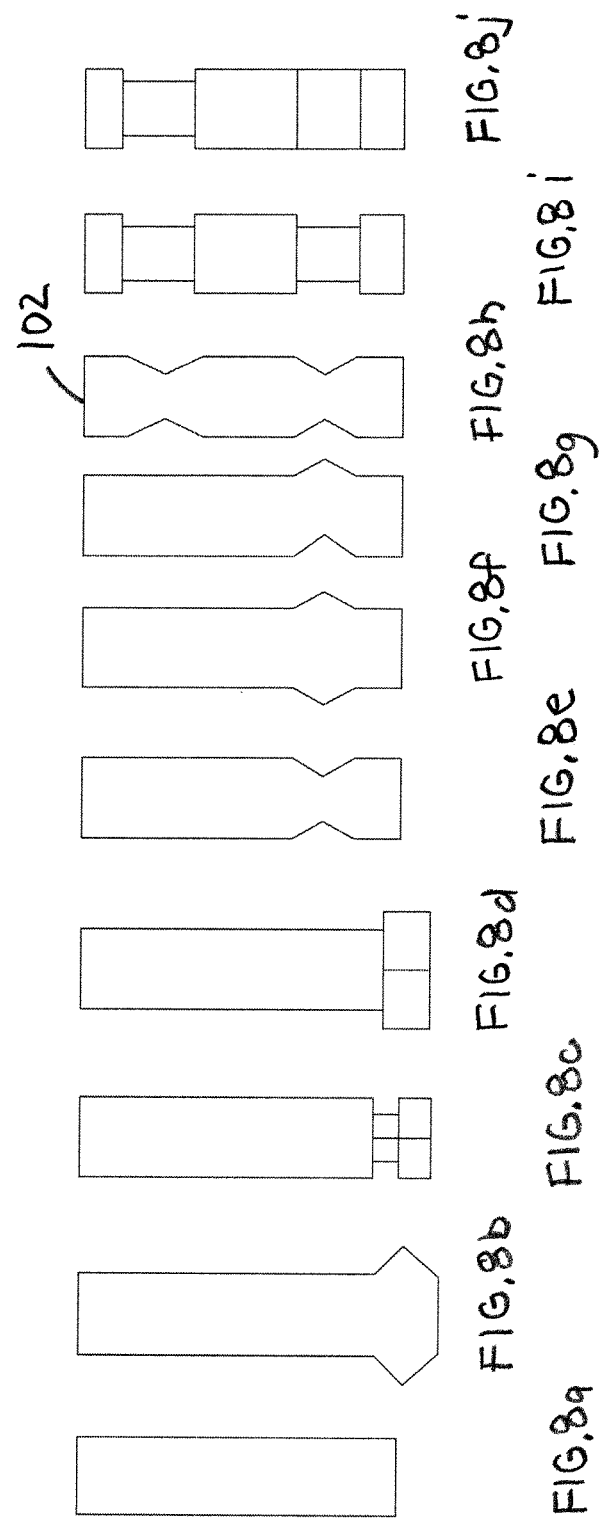

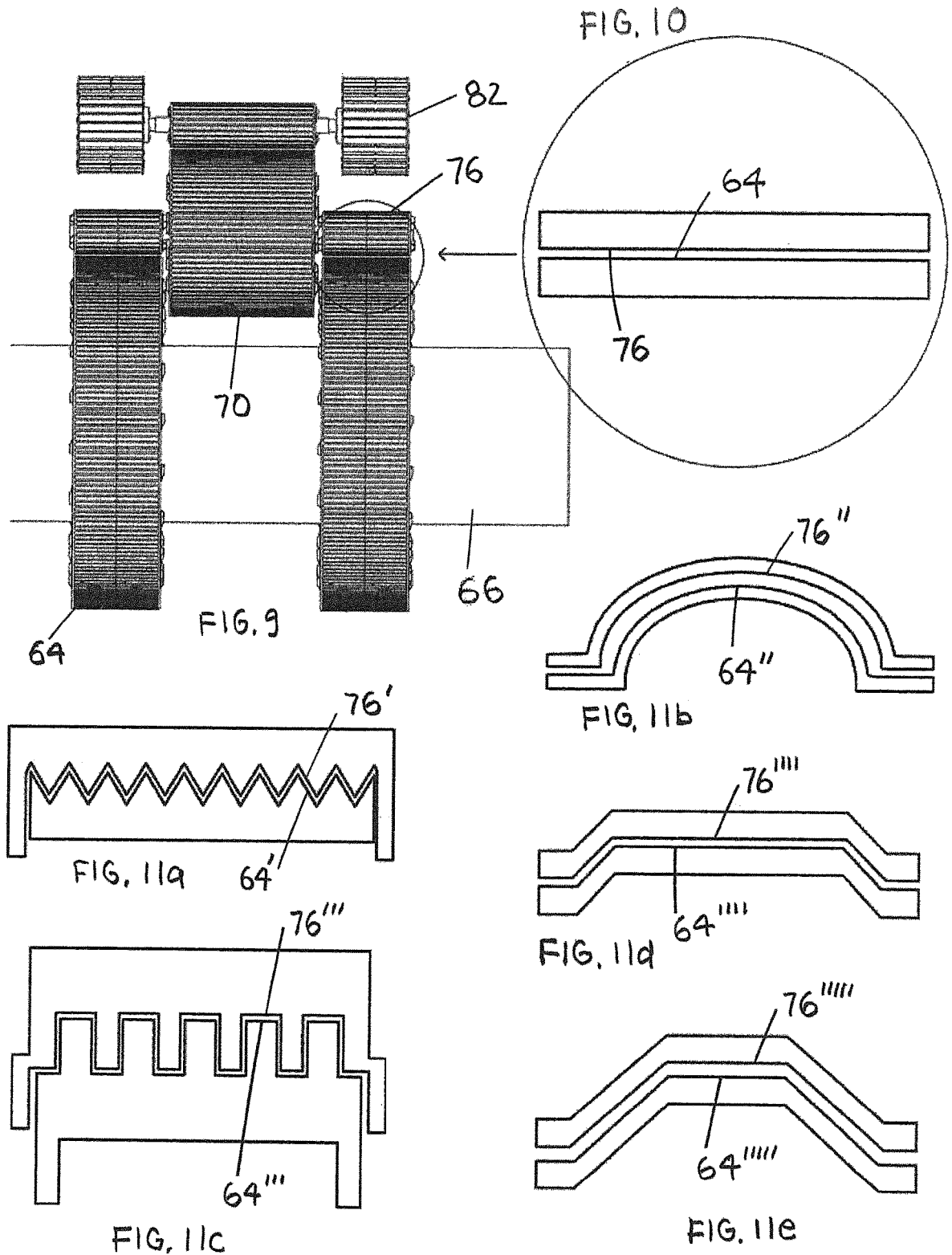

WIND TURBINE WITH ADAPTIVE NACELLE

BACKGROUND OF THE INVENTION

1. Field of the Invention

The present invention relates generally to wind power generation and more specifically to a wind turbine with an adaptive nacelle, which uses multiple reciprocating generators with magnetic gears to generate electrical power.

2. Discussion of the Prior Art

In recent years and even decades wind turbines have only experienced incremental advancements in technology or power generation capacity. The part of a wind turbine most likely to fail is the gearbox required to speed up the shaft RPM enough to produce power, and because of that current wind turbines have transitioned to a "direct-drive" shaft-to-generator model. The biggest drawback facing this design (and previous designs) is the cut-in/cut-out wind speed range that wind turbines can produce power. This requires wind turbines to be designed with an operating range that attempts to cover as much of the average wind speeds (typically 10 MPH-30 MPH) but does mean that they cannot produce energy at wind speeds that are too slow or fast.

To solve the problem of wind speeds outside the range of 10-30 mph, this invention proposes a concept of generating power with a wind turbine by lining the blade shaft with rows of magnets and utilizing a plurality of smaller reciprocating generators (such as permanent magnet generators or any generator capable of operating at slow speeds) that can be engaged or disengaged from the blade shaft through the use of reciprocating air-cooled magnetic gears. This engagement and disengagement will be determined by the current wind speed and is done by mounting the magnetic gears and generators in a way that allows them to be moved close enough for the magnets in the magnetic gear to engage the magnets on the blade shaft or further from the shaft to disengage the magnets. The use of magnetic gears makes it possible for them to be engaged to a spinning shaft without the wear and tear of traditional mechanical gears. The design of the wind turbine with adaptive nacelle can be utilized to produce wind turbines that greatly exceed the power output of any other wind turbine on the market by using a much larger tower and nacelle, which can support a longer shaft and more magnetic gears and generators. For example, utilizing a Symmetrical Biconvex shaped tower, which would rotate at a base, and would enable a larger nacelle to be built than that of a traditional wind turbine tower.

A wind turbine with a "direct drive generator" or "gearbox generator" would always be connected to a blade shaft, which produces resistance for the wind turbine blades and requires a higher wind speed to begin spinning. With the wind turbine with adaptive nacelle, it is possible for all of the magnetic gears and generators to be disengaged and allow for the blades to start spinning with minimal wind, as the shaft is able to spin freely as the wind speed increases, the wind turbine with adaptive nacelle has the ability to begin engaging the magnetic gears and plurality of smaller generators incrementally and begin producing power at much slower wind speeds. Because the generators are engaged or disengaged incrementally, the wind turbine with adaptive nacelle can be built with a much higher generator capacity than traditional models. When more generators are engaged to match wind speed, they not only continue to produce more power, but also act as a braking system by increasing resistance to the shaft and help to keep the wind turbine with adaptive nacelle operational at winds speeds much higher than the typical 30 MPH cut-out speed of current wind turbines.

Another key benefit of the wind turbine with adaptive nacelle is the ability to implement the system in both retrofitting existing wind turbines and with newly built wind turbines. When retrofitting existing wind turbines with the adaptive nacelle, there will generally be two options to incorporate the magnetic gear and generator system. If the existing wind turbine has a section of the shaft that is exposed, rows of magnets may be mounted to the unused section of shaft. A plurality of magnetic gears and generators may be mounted around the blade shaft, such that magnetic gears and generators may be engaged or disengaged. In this scenario, the magnetic gears and generators will be used to increase the cut-out wind speed of an existing wind turbine by simultaneously producing power at higher wind speeds and acting as a braking mechanism to prevent over-rotating. The other retrofit option is to remove the existing direct drive generator (and if applicable the gearbox), adding to the overall length of the shaft, lining the entire length of the shaft with rows of magnets and installing a plurality of magnetic gears and generators around/along the blade shaft that can be engaged or disengaged with the blade shaft.

The wind turbine with adaptive nacelle is a ground breaking technology when used in retrofitting wind turbines but can be even more impactful, when manufacturing a new wind turbine. Due to its ability to incrementally increase or decrease the number of generators engaged with the blade shaft, and therefore the amount of resistance applied to the blade shaft. The system can be built with a much greater power output capacity. Instead of having the blade shaft connected to and engaged with one large generator, the wind turbine with adaptive nacelle has a free spinning blade shaft mounted inside a nacelle lined with rows of magnets with a plurality of magnetic gears and generators around and along the blade shaft. The use of magnetic gears and smaller generators allows for greater flexibility in designing the layout of the system as they can be mounted around a perimeter and along a length of the blade shaft to be engaged or disengaged from the blade shaft.

When compared to a 11-speed speed bicycle, the wind turbine with adaptive nacelle would be able to take advantage of all 11 gears, while a traditional wind turbine would only be able to use gears 3-6. The traditional wind turbine takes more force to get started, but is also limited to how fast it can go.

Traditional mechanical gears are responsible for a large loss of efficiency through kinetic energy and are prone to damage and failure because of the forces applied to them, especially in high torque environments like in power production. This is only exasperated when trying to engage a gear to a shaft that is already spinning. Magnetic gears are easily engaged or disengaged by moving them closer or further apart. The magnetic gears can also be engaged to the spinning shaft much safer as they will not physically be touching each other. The magnetic gears will have a series of air-cooling holes running the entire width of the gears but instead of being a straight line across the gear, will be offset from one another by about 5 degrees or more. The air-cooling holes will be terminated on each end by covered by an air intake cover arranged so that all the air intake covers on each side will face the same way but will be opposite to the other side of the magnetic gear. The plurality of air intake covers offset from each other will increase the air-cooling passing through the air-cooling holes and lead to more cooling of the magnetic gear.

As the gear spins forward, the air intake covers on one side will be facing the same direction and will force air into the air-cooling holes and out through the other air intake cover facing backwards. As the air intake covers are facing opposite sides, the same principle will work with the magnetic gear spinning in the opposite direction. Air enters and exits each air intake cover through at least one open edge thereof. In addition, the diameter of the air-cooling holes will be widest at each end and narrowest at the middle, which will help increase the volume of airflow through the inlets, similar to a venturi. The magnetic gear system will lead to less down-time, lower service costs and increased reliability which is all crucial for power production and even more so for wind turbines installed in remote areas and in bodies of water.

The air-cooled magnetic gear system can also be designed in a variety of ways that could potentially increase the amount of surface area between the magnets of two different magnetic gears in order to increase the magnetic pull. This could include a spur style arrangement or various other teeth or shapes other than only flat magnet faces on both gears.

Accordingly, there is a clearly felt need in the art for a wind turbine with adaptive nacelle, which uses multiple reciprocating generators with magnetic gears to generate electrical power, and may be applied to new wind turbines, or retrofitted to existing wind turbines.

SUMMARY OF THE INVENTION

The present invention provides a wind turbine with adaptive nacelle, which uses multiple reciprocating generators with magnetic gears to generate electrical power. The wind turbine with adaptive nacelle preferably includes a geared blade shaft; and at least one reciprocating generator unit. The geared blade shaft includes a plurality of blade magnets attached to an outer perimeter of the blade shaft, which extend a portion of a length of the blade shaft. The plurality of blade magnets are preferably located parallel to a lengthwise axis of the blade shaft.

Each reciprocating generator unit preferably includes an intermediate magnetic gear, at least one magnetic generator gear, at least one electrical generator, at least one actuator and a retention frame. The intermediate magnetic gear preferably includes a cylindrical intermediate base, an intermediate shaft (not shown) and a plurality of intermediate magnets. The cylindrical intermediate base is retained on the intermediate shaft. The plurality of intermediate magnets are attached to the cylindrical intermediate base with any suitable process, such as bonding. The plurality of intermediate magnets are preferably parallel to a lengthwise axis of the cylindrical intermediate base.

Each magnetic generator gear preferably includes a cylindrical generator base, a generator shaft and a plurality of generator magnets. The cylindrical generator base is retained on the generator shaft. The plurality of generator magnets are attached to the cylindrical generator base with any suitable process, such as bonding. The plurality of generator magnets are preferably parallel to a lengthwise axis of the cylindrical generator base. A plurality of air-cooling holes are formed through a width of the cylindrical generator base, adjacent the plurality of generator magnets.

The retention frame preferably includes a first frame member and a second frame member. A first actuator rod of a first actuator is secured to the first frame member. The first actuator is attached to a nacelle frame. A second actuator rod of a second actuator is secured to the second frame member. The second actuator is attached to the nacelle frame. A first end of the intermediate shaft is rotatably retained in the first frame member and a second end of the intermediate shaft is rotatably retained in the second frame member. A first end of the at least one generator shaft is rotatably retained in the first frame member and a second end of the generator shaft is rotatably retained in the second frame member. A housing of each generator is mounted to at least one of the first and second frame members.

The turbine blades rotate the blade shaft in the adaptive nacelle. When the speed of the blade shaft reaches a minimum rpm, the actuator rods of the actuators of the reciprocating generator unit are extended to bring the intermediate magnet gear adjacent the plurality of blade magnets. The plurality of blade magnets cause the intermediate magnetic gear to rotate through a magnetic field. The rotation of the intermediate magnetic gear causes the at least one generator magnetic gear to rotate. Rotation of the at least one generator magnetic gear causes electricity to be output from the at least one generator.

A second embodiment of the wind turbine with adaptive nacelle includes the ability to greatly increase the rotational speed of at least one reciprocating generator unit. The second embodiment of the wind turbine with adaptive nacelle preferably includes at least two blade magnetic gears, an intermediate magnetic gear unit, at least one generator unit, at least one actuator and at least one retention frame. The retention frame includes a first frame member and a second frame member. Each multiple blade magnetic gear includes a cylindrical blade base and a plurality of blade magnets. The cylindrical blade base is retained on a blade shaft of a wind turbine. The plurality of blade magnets are preferably located parallel to a lengthwise axis of the blade shaft. The plurality of blade magnets create a magnetic blade gear on the outer perimeter of the blade shaft.

The intermediate magnetic gear unit preferably includes a driven magnetic gear, a drive magnetic gear and an intermediate shaft. The driven magnetic gear and the drive magnetic gear are retained on the intermediate shaft. The driven magnetic gear includes a cylinder driven base and a plurality of driven magnets. The drive magnetic gear includes a cylinder drive base and a plurality of drive magnets. The intermediate shaft is rotatably retained by the first and second frame members. Each generator unit includes at least one generator, a generator shaft and a generator magnetic gear. The generator shaft is pivotally retained by the first and second frame members. Each generator is attached to one of the first and second frame members. The generator magnetic gear includes a cylinder generator base and a plurality of generator magnets. A first actuator is attached to the first frame member and a second actuator is attached to the second frame member. Opposing ends of the first and second actuators are attached to the nacelle frame.

An existing blade shaft of a nacelle may be retrofitted to include at least one reciprocating generator unit and a plurality of blade magnets attached to the blade shaft. The reciprocating generator unit is moved with at least one actuator, which is anchored to a nacelle frame.

Accordingly, it is an object of the present invention to provide a wind turbine with adaptive nacelle, which uses multiple reciprocating generators with magnetic gears to generate electrical power, and may be applied to new wind turbines, or retrofitted to existing wind turbines.

BRIEF DESCRIPTION OF THE DRAWINGS

FIG. 8a is end view of a first magnet profile of a wind turbine with adaptive nacelle in accordance with the present invention.

FIG. 8b is end view of a second magnet profile of a wind turbine with adaptive nacelle in accordance with the present invention.

FIG. 8c is end view of a third magnet profile of a wind turbine with adaptive nacelle in accordance with the present invention.

FIG. 8d is end view of a fourth magnet profile of a wind turbine with adaptive nacelle in accordance with the present invention.

FIG. 8e is end view of a fifth magnet profile of a wind turbine with adaptive nacelle in accordance with the present invention.

FIG. 8f is end view of a sixth magnet profile of a wind turbine with adaptive nacelle in accordance with the present invention.

FIG. 8g is end view of a seventh magnet profile of a wind turbine with adaptive nacelle in accordance with the present invention.

FIG. 8h is end view of an eighth magnet profile of a wind turbine with adaptive nacelle in accordance with the present invention.

FIG. 8i is end view of a ninth magnet profile of a wind turbine with adaptive nacelle in accordance with the present invention.

FIG. 8j is end view of a tenth magnet profile of a wind turbine with adaptive nacelle in accordance with the present invention.

FIG. 9 is a front view of a second embodiment of a wind turbine with adaptive nacelle including a reciprocating generator unit and a blade shaft, without a retention frame and actuators shown in accordance with the present invention.

FIG. 10 is an enlarged view of a portion of FIG. 9 illustrating a flat top surface of mating magnet gear teeth of a second embodiment of a wind turbine with adaptive nacelle in accordance with the present invention.

FIG. 11a is an end view of a first magnet profile of magnets mating with each other of a wind turbine with adaptive nacelle in accordance with the present invention.

FIG. 11b is an end view of a second magnet profile of magnets mating with each other of a wind turbine with adaptive nacelle in accordance with the present invention.

FIG. 11c is an end view of a third magnet profile of magnets mating with each other of a wind turbine with adaptive nacelle in accordance with the present invention.

FIG. 11d is an end view of a fourth magnet profile of magnets mating with each other of a wind turbine with adaptive nacelle in accordance with the present invention.

FIG. 11e is an end view of a fifth magnet profile of magnets mating with each other of a wind turbine with adaptive nacelle in accordance with the present invention.

DETAILED DESCRIPTION OF THE PREFERRED EMBODIMENTS

Figure 1:
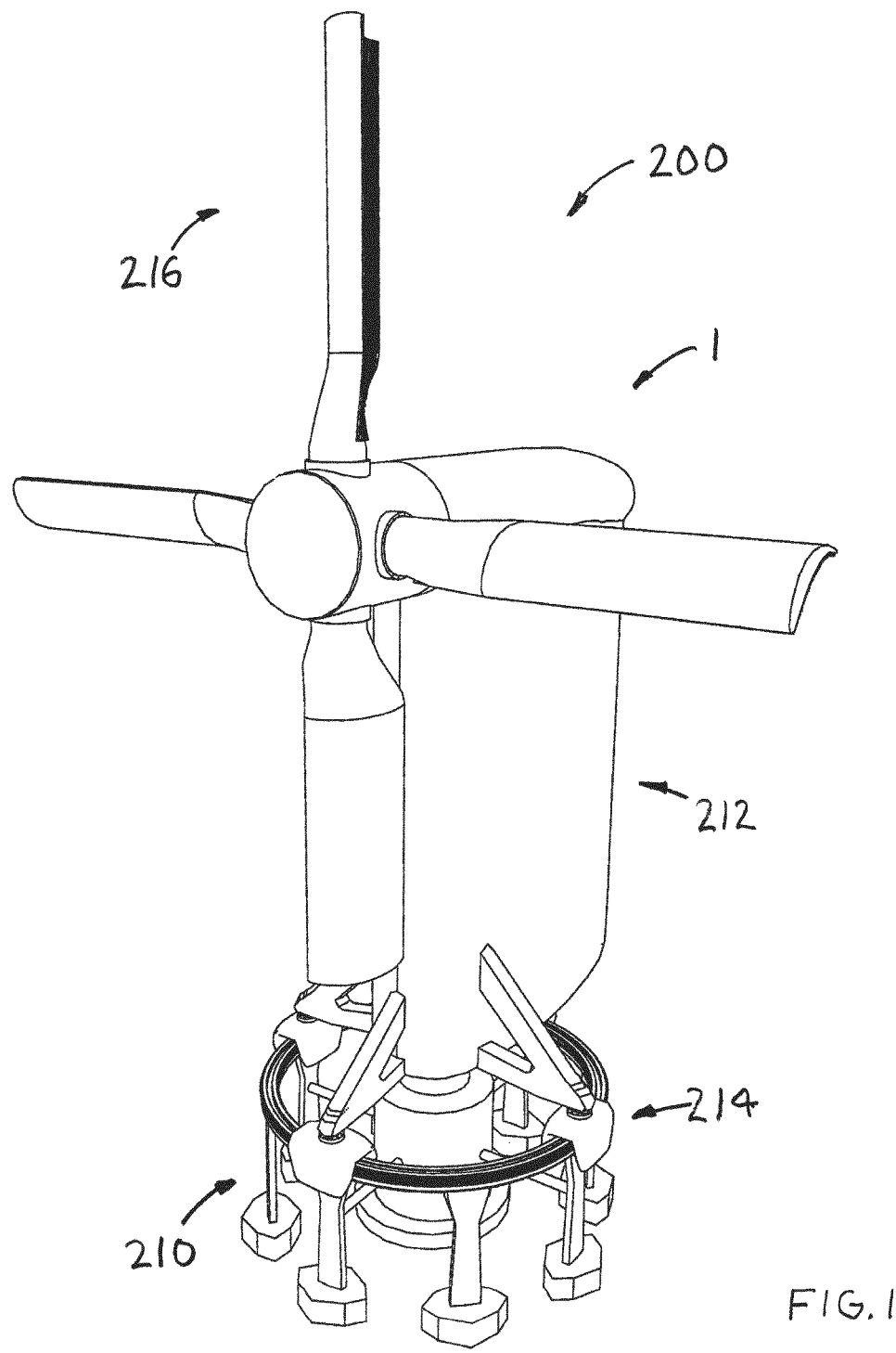
FIG. 1 is a perspective view of a wind turbine rotating tower.
Figure 2:
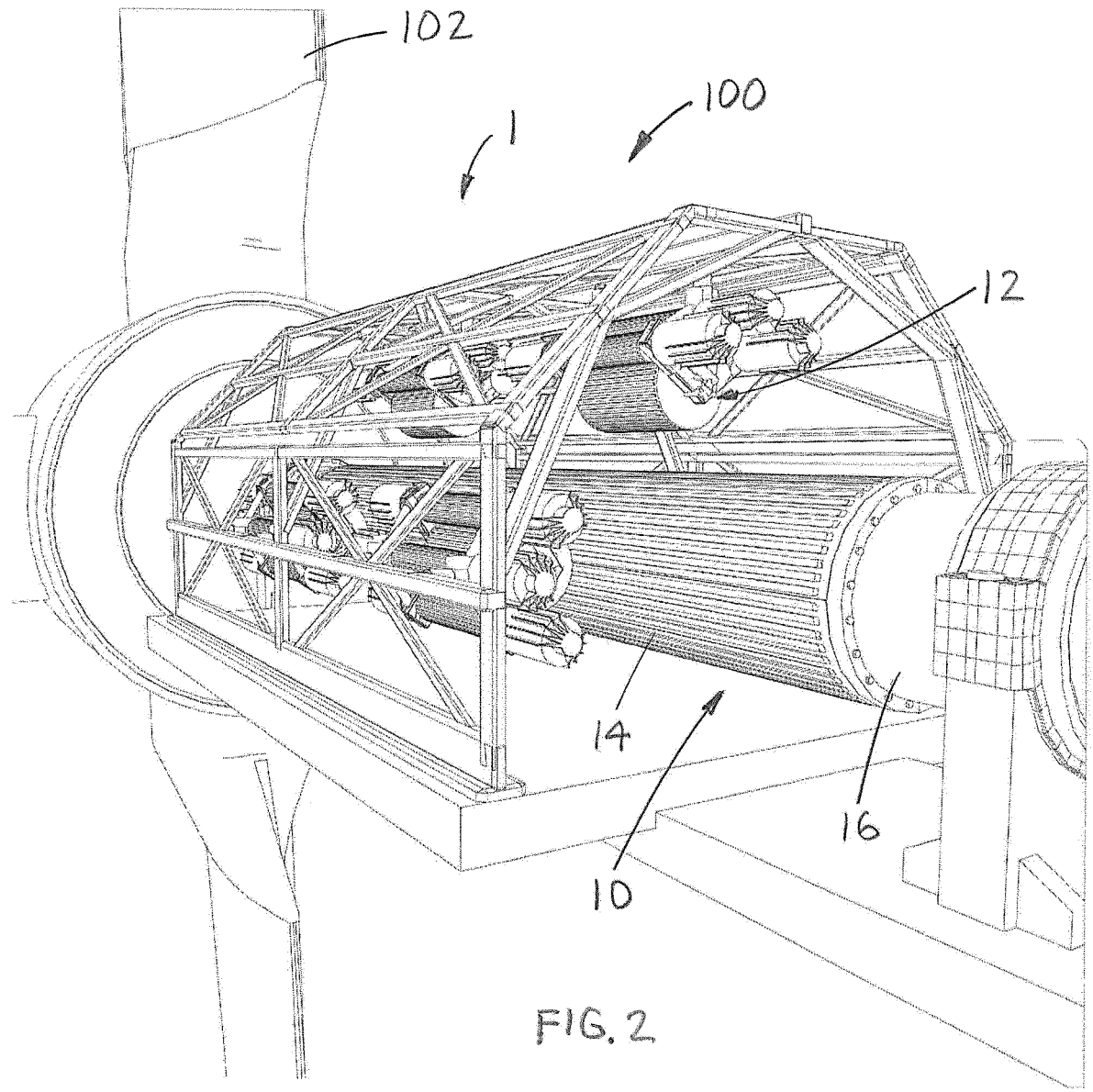
FIG. 2 is a perspective view of a wind turbine with an adaptive nacelle with a nacelle cover removed in accordance with the present invention.

With reference now to the drawings, and particularly to FIG. 2, there is shown a perspective view of a wind turbine with adaptive nacelle 1. With reference to FIG. 1, a wind turbine rotating tower 200 preferably includes the adaptive nacelle 1, a stationary base 210, a rotating tower 212, a plurality of motor systems 214 and a blade assembly 216. With reference to FIG. 2, the wind turbine with adaptive nacelle 1 preferably includes a geared blade shaft 10; and at least one reciprocating generator unit 12. Each reciprocating generator unit 12 includes a plurality of blade magnets 14 attached to an outer perimeter of a blade shaft 16, which extend a portion of a length of the blade shaft 16. The plurality of blade magnets 14 are preferably located parallel to a lengthwise axis of the blade shaft 16.

Figure 4:
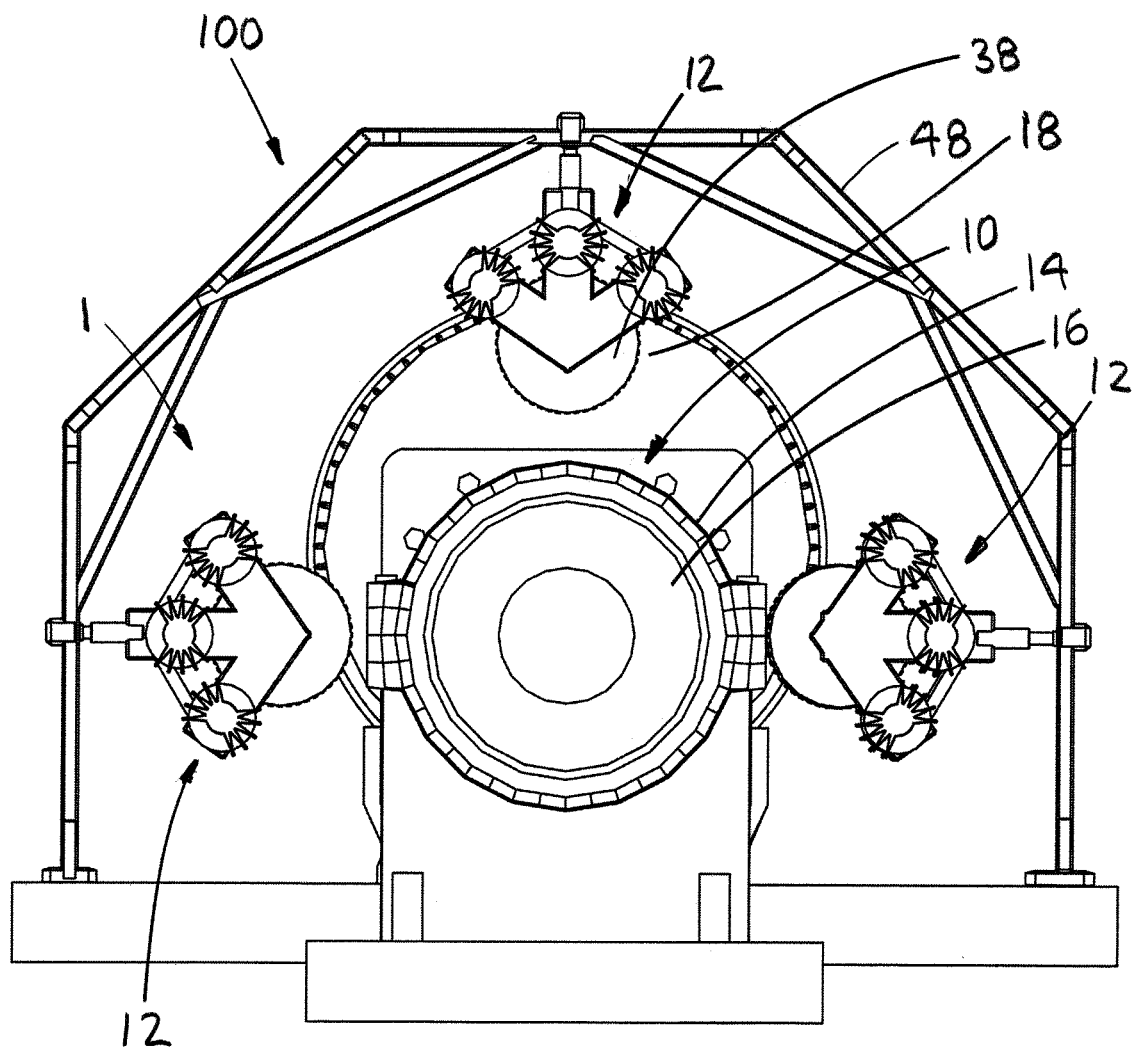
FIG. 4 is an end view of an adaptive nacelle of a wind turbine in accordance with the present invention.

Each reciprocating generator unit 12 preferably includes an intermediate magnetic gear 18, at least one magnetic generator gear 20, at least one electrical generator 22, at least one actuator 24 and a retention frame 26. The intermediate magnetic gear 18 preferably includes a cylindrical intermediate base 28, an intermediate shaft (not shown) and a plurality of intermediate magnets 30. The cylindrical intermediate base 28 is retained on the intermediate shaft. The plurality of intermediate magnets 30 are attached to the cylindrical intermediate base 28 with any suitable process, such as bonding. The plurality of intermediate magnets 30 are preferably parallel to a lengthwise axis of the cylindrical intermediate base 28. With reference to FIG. 4, a plurality of air-cooling holes 32 are formed through a width of the cylindrical intermediate base 28, adjacent the plurality of intermediate magnets 30 and parallel to the lengthwise axis of the cylindrical intermediate base 28. Each air-cooling hole 32 preferably has a lengthwise venturi shape and is terminated on each one with air intake covers 34, 36. Air enters one end of the air-cooling hole 32 through the first air intake cover 34 and exits through the second air intake cover 36. Air enters and exits each air intake cover through at least one open edge thereof.

Each magnetic generator gear 20 preferably includes a cylindrical generator base 38, a generator shaft (not shown) and a plurality of generator magnets 40. The cylindrical generator base 38 is retained on the generator shaft. The plurality of generator magnets 40 are attached to the cylindrical generator base 38 with any suitable process, such as bonding. The plurality of generator magnets 40 are preferably parallel to a lengthwise axis of the cylindrical generator base 38. The plurality of air-cooling holes 32 are formed through a width of the cylindrical generator base 38, adjacent the plurality of generator magnets 40 and preferably offset by an acute angle from the lengthwise axis of the cylindrical generator base 38. Each air-cooling hole 32 is terminated on each end with air intake covers 34, 36.

Figure 3:
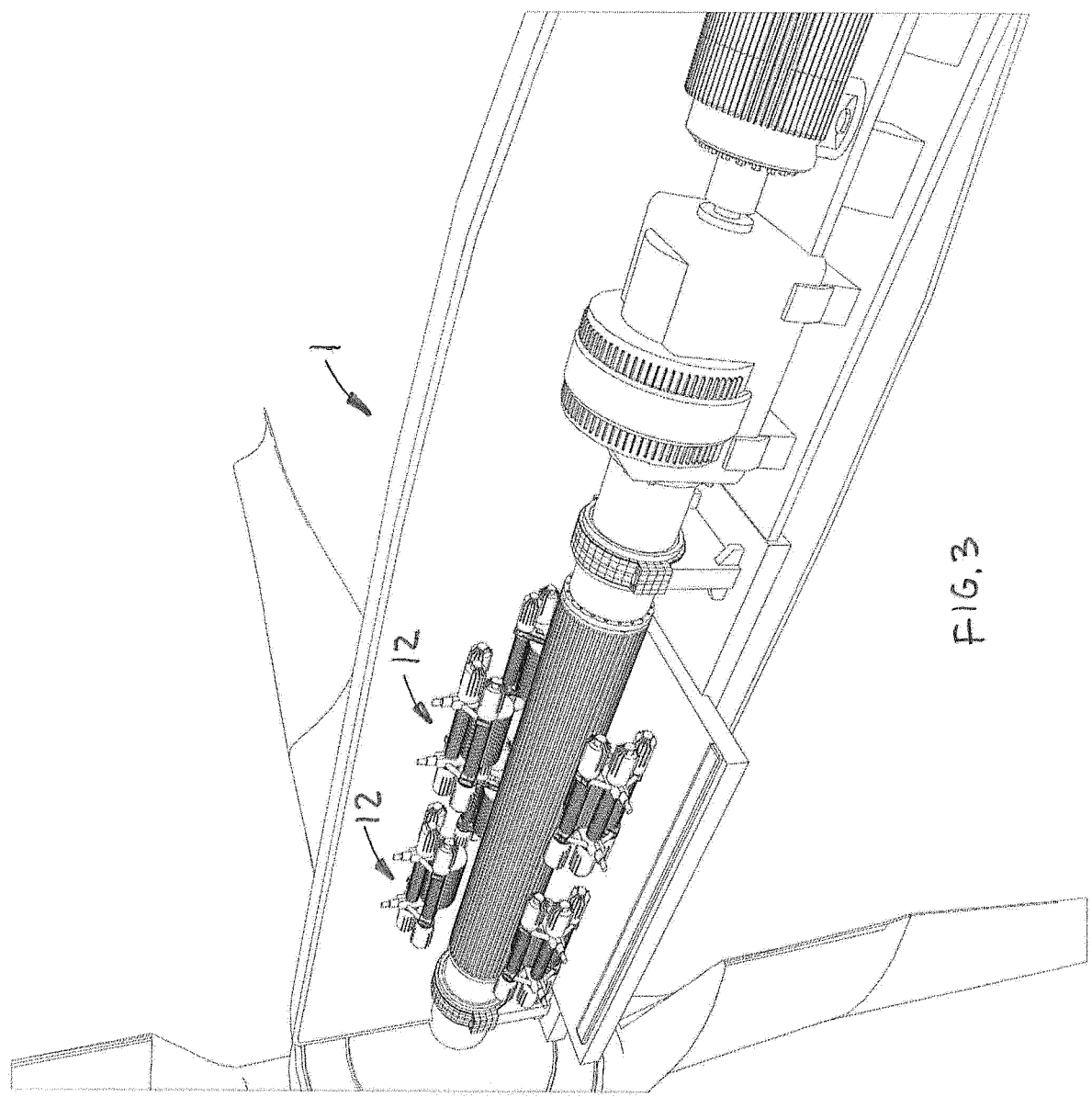
FIG. 3 is an enlarged cutaway perspective view of a wind turbine with an adaptive nacelle in accordance with the present invention.

The retention frame 26 preferably includes a first frame member 42 and a second frame member 44. A first actuator 46 is secured to the first frame member 42. With reference to FIG. 3, the first actuator is attached to a nacelle frame 48. A second actuator 50 is secured to the second frame member 44. The second actuator 50 is attached to the nacelle frame 48. A first end of the intermediate shaft is rotatably retained in the first frame member 42 and a second end of the intermediate shaft is rotatably retained in the second frame member 44. A first end of the at least one generator shaft is rotatably retained in the first frame member 42 and a second end of the generator shaft is rotatably retained in the second frame member 44. Each generator housing 52 of each electrical generator 22 is mounted to at least one of the first and second frame members 42, 44.

The turbine blades 102 of the wind turbine 100 rotate the blade shaft 16 in the adaptive nacelle 1. When the speed of the blade shaft 16 reaches a minimum rpm, the first and second actuators 46, 50 of the reciprocating generator unit 12 are extended to bring the intermediate magnet gear 18 adjacent the plurality of blade magnets 14. The plurality of blade magnets 14 cause the intermediate magnetic gear 18 to rotate through a magnetic field. The rotation of the intermediate magnetic gear 18 causes the at least one generator magnetic gear 20 to rotate. Rotation of the at least one generator magnetic gear 20 causes electrical energy to be output from the at least one generator 22.

Figure 5:
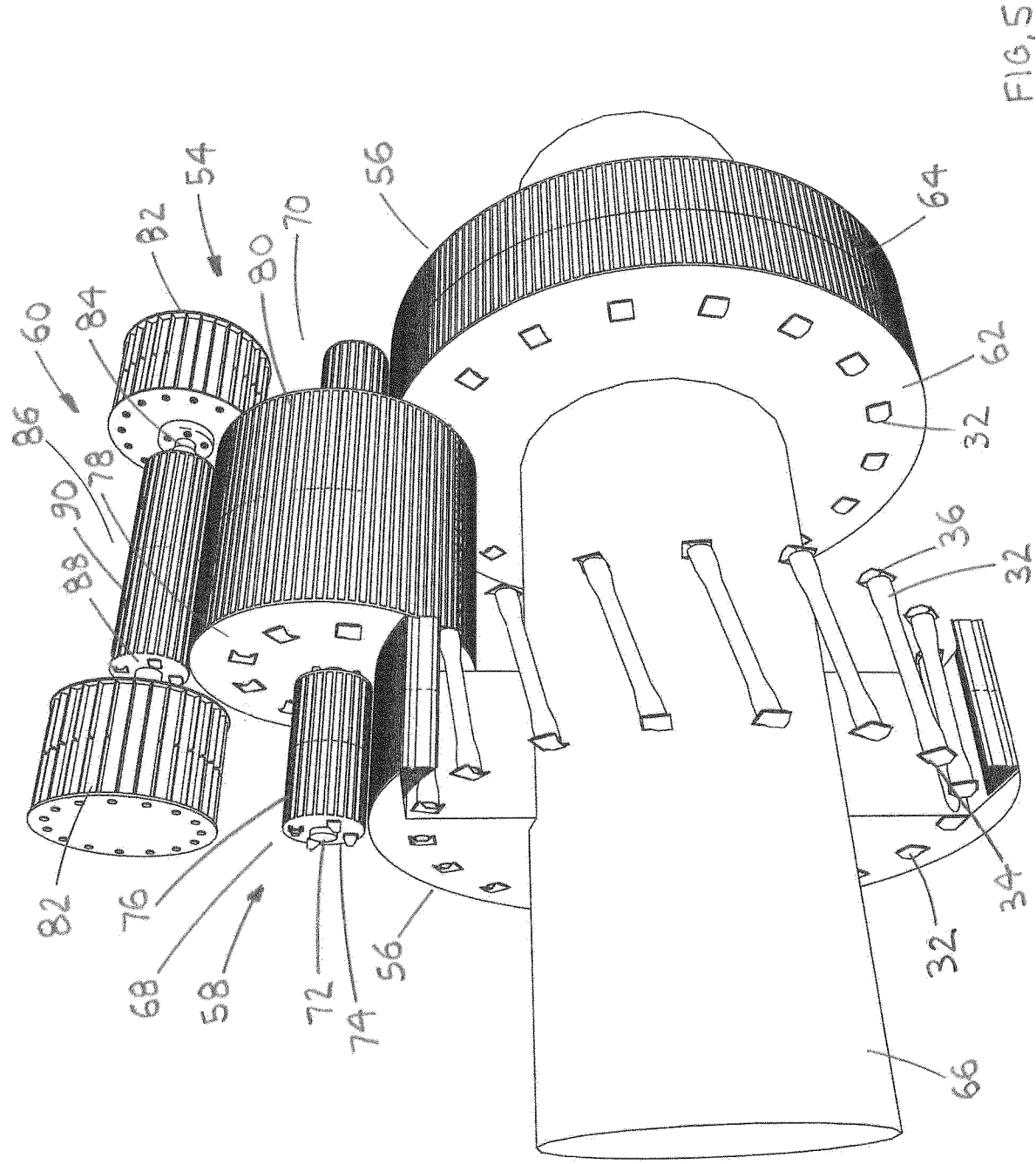
FIG. 5 is a perspective view of a second embodiment of a wind turbine with adaptive nacelle including a reciprocating generator unit and a blade shaft, without a retention frame and actuators shown in accordance with the present invention.

With reference to FIG. 5, a second embodiment of the wind turbine with adaptive nacelle 2 includes the ability to greatly increase the rotational speed of at least one reciprocating generator unit 54. The wind turbine with adaptive nacelle 2 preferably includes the at least one reciprocating generator unit 54 and at least two blade magnetic gears 56. Each reciprocating generator unit 54 preferably includes an intermediate magnetic gear unit 58, at least one generator unit 60, at least one actuator (not shown) and at least one retention frame (not shown). The retention frame preferably includes a first frame member and a second frame member as previously disclosed in FIG. 3. Each multiple blade magnetic gear 56 includes a cylindrical blade base 62 and a plurality of blade magnets 64. The cylindrical blade base 62 is retained on a blade shaft 66 of a wind turbine. The plurality of blade magnets 64 are attached to an outer perimeter of the blade shaft 66, which extend a portion of a length of the blade shaft 66. The plurality of blade magnets 64 are located parallel to a lengthwise axis of the blade shaft 66. Air cooling holes 32 are formed through a width of the magnetic blade gear 56. The plurality of blade magnets 64 create the magnetic blade gear 56 on the outer perimeter of the blade shaft 66.

The intermediate magnetic gear unit 58 preferably includes a driven magnetic gear 68, a drive magnetic gear 70 and an intermediate shaft 72. The driven magnetic gear 68 and the drive magnetic gear 70 are retained on the intermediate shaft 72. The driven magnetic gear 68 includes a cylinder driven base 74, and a plurality of driven magnets 76. The drive magnetic gear 70 includes a cylinder drive base 78, and a plurality of drive magnets 80. The intermediate shaft 72 is rotatably retained by the first and second frame members. Each generator unit 60 includes at least one generator 82, a generator shaft 84 and a generator magnetic gear 86. The generator shaft 84 is pivotally retained by the first and second frame members. The at least one generator 82 is attached to one of the first and second frame members.

The generator magnetic gear 86 includes a cylinder generator base 88, air cooling holes 89 and a plurality of generator magnets 90. A first actuator is attached to the first frame member and a second actuator is attached to the second frame member. Opposing ends of the first and second actuators are attached to the nacelle frame.

Figure 6:
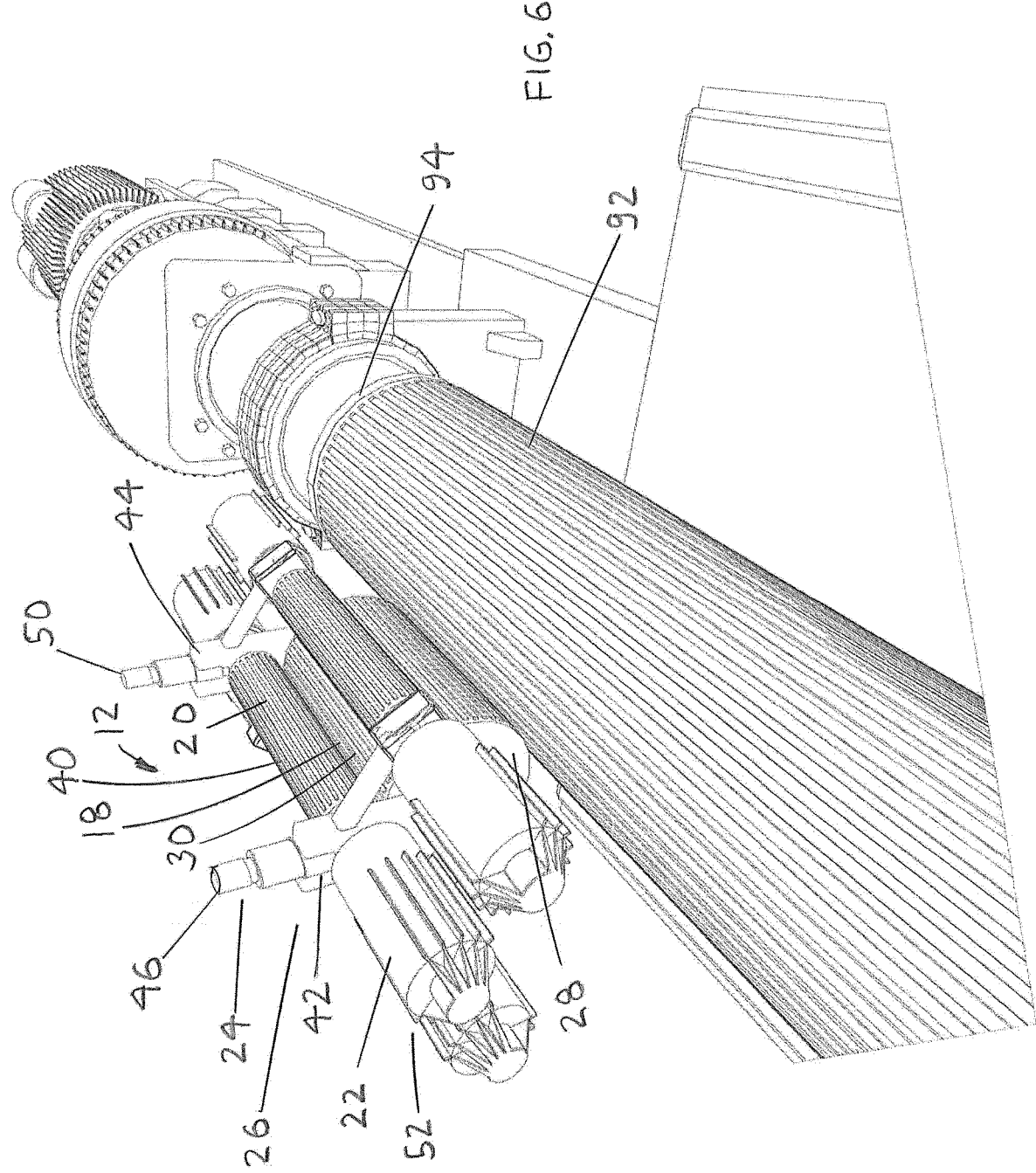
FIG. 6 is a perspective view of a nacelle of a prior art wind turbine retrofitted with a plurality of blade magnets on a blade shaft and a reciprocating generator unit in accordance with the present invention.

With reference to FIG. 6 discloses a reciprocating generator unit 12 and a plurality of blade magnets 92 attached to the blade shaft 94. The reciprocating generator unit 12 is moved with at least one actuator (not shown), which is anchored to a nacelle frame (not shown).

Figure 7:
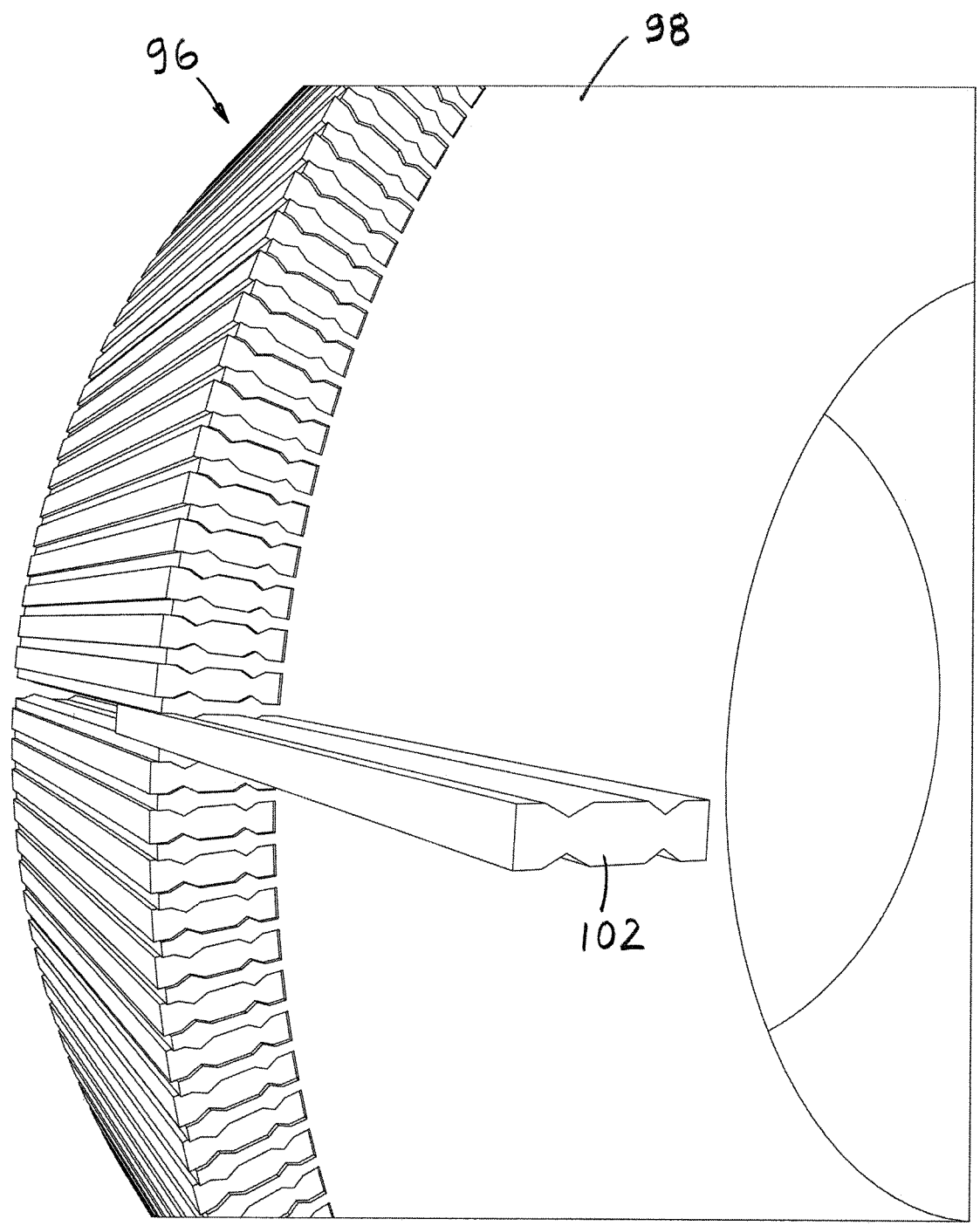
FIG. 7 is a perspective view of a magnet gear with a single magnet partially inserted into a cylindrical base of a wind turbine with adaptive nacelle in accordance with the present invention.

With reference to FIG. 7 is a magnet gear 96 with a single magnet 104 partially inserted into a cylindrical base 98. FIGS. 8*a*-8*j* disclose ten different end profiles of magnets for retention in a cylindrical base, including magnet 102 in FIG. 8*h*. The plurality of magnets may be retained with fasteners and/or end plates. FIG. 9 is a front view of a second embodiment of a wind turbine with adaptive nacelle including a reciprocating generator unit 54 and a blade shaft 66. FIG. 10 is an enlarged view of a magnets 64, 76 of the second embodiment of a wind turbine with adaptive nacelle in FIG. 9. FIG. 11*a* is an end view of a first magnet profile having a saw tooth pattern, illustrating magnets 64', 76' mating with each other. FIG. 11*b* is an end view of a second magnet profile having a curved shape, illustrating magnets 64", 76" mating with each other. FIG. 11*c* is an end view of a third magnet profile having a square tooth pattern. FIG. 11*d* is an end view of a fourth magnet profile having a first offset shape, illustrating magnets 64"', 76"' mating with each other. FIG. 11*e* is an end view of a fifth magnet profile having a second offset shape, illustrating magnets 64""', 76""' mating with each other.

While particular embodiments of the invention have been shown and described, it will be obvious to those skilled in the art that
changes and modifications may be made without departing from the invention in its broader aspects, and therefore, the aim in the appended claims is to cover all such changes and modifications as fall within the true spirit and scope of the invention.

The invention claimed is:

1. A wind turbine with an adaptive nacelle, comprising:
   a geared blade shaft includes a blade shaft and a plurality of blade magnets, said plurality of blade magnets are attached to an outer perimeter of said blade shaft; and
   at least one reciprocating generator unit includes an intermediate magnetic gear, at least one magnetic generator gear, at least one electrical generator, at least one actuator and a retention frame, said intermediate magnetic gear and said at least one magnetic generator gear are rotatably retained by said retention frame, wherein rotation of said geared blade shaft causes rotation of said intermediate magnetic gear, which causes rotation of said at least one magnetic generator gear, which causes rotation of said at least one electrical generator, when said at least one reciprocating generator unit is radially moved from a disengagement position to an engagement position relative to said geared blade shaft;
   a plurality of air-cooling holes are formed through a width of said plurality of gears; and
   an entrance and an exit of said plurality of air-cooling holes are terminated with air intake covers.

2. The wind turbine with the adaptive nacelle of claim 1, wherein:
   each one of said at least one generator magnetic gear and said intermediate magnetic gear includes a cylindrical base and a plurality of magnets.

3. The wind turbine with the adaptive nacelle of claim 2, wherein:
    said plurality of magnets are attached to said cylindrical base with a bonding substance.

4. The wind turbine with the adaptive nacelle of claim 2, wherein:
    a lengthwise axis of said at least one generator magnetic gear and said intermediate magnetic gear are parallel to a lengthwise axis of said geared blade shaft.

5. A wind turbine with an adaptive nacelle, comprising:
    a geared blade shaft includes a blade shaft and a plurality of blade magnets, said plurality of blade magnets are attached to an outer perimeter of said blade shaft;
    at least one reciprocating generator unit includes an intermediate magnetic gear, at least one magnetic generator gear, at least one electrical generator, at least one actuator and a retention frame, said intermediate magnetic gear and said at least one magnetic generator gear are rotatably retained by said retention frame, wherein rotation of said blade shaft causes rotation of said intermediate magnetic gear, which causes rotation of said at least one magnetic generator gear, which causes rotation of said at least one electrical generator; and
    one end of said at least one actuator is attached to said retention frame, an opposing end of said at least one actuator is retained by a nacelle frame of the adaptive nacelle, said at least one actuator is used to radially move said at least one reciprocating generator unit from a disengagement position to an engagement position relative to said geared blade shaft;
    a plurality of air-cooling holes are formed through a width of said plurality of gears; and
    an entrance and an exit of said plurality of air-cooling holes are terminated with air intake covers.

6. The wind turbine with the adaptive nacelle of claim 5, wherein:
    each one of said at least one generator magnetic gear and said intermediate magnetic gear includes a cylindrical base and a plurality of magnets.

7. The wind turbine with the adaptive nacelle of claim 6, wherein:
    said plurality of magnets are attached to said cylindrical base with a bonding substance.

8. The wind turbine with the adaptive nacelle of claim 6, wherein:
    a lengthwise axis of said at least one generator magnetic gear and said intermediate magnetic gear are parallel to a lengthwise axis of said geared blade shaft.

9. A wind turbine with an adaptive nacelle, comprising:
    a geared blade shaft includes a blade shaft and at least two blade magnetic gears, said at least two blade magnetic gears are retained on said blade shaft; and
    at least one reciprocating generator unit includes an intermediate unit, a generator unit and a retention frame, said intermediate unit includes two intermediate driven magnetic gears, one of said two intermediate driven magnetic gears is located on a first end of said intermediate drive magnetic gear and the other one is located on a second end thereof, said intermediate unit is rotatably retained by said retention frame, said generator unit includes at least one electrical generator, a generator shaft and a generator magnetic gear, said generator magnetic gear is retained on said generator shaft, said at least one electrical generator is driven by said generator shaft, said at least one electrical generator is secured to said retention frame, wherein rotation of said geared blade shaft rotates said intermediate unit, which rotates said generator unit, which rotates said at least one electrical generator, when said at least one reciprocating generator unit is radially moved from a disengagement position to an engagement position relative to said geared blade shaft.

10. The wind turbine with the adaptive nacelle of claim 9, wherein:
    a plurality of air-cooling holes are formed through a width of said plurality of gears.

11. The wind turbine with the adaptive nacelle of claim 10, wherein:
    an entrance and an exit of said plurality of air-cooling holes are terminated with air intake covers.

12. The wind turbine with the adaptive nacelle of claim 9, wherein:
    each one of said at least one generator magnetic gear and said two intermediate driven magnetic gears includes a cylindrical base and a plurality of magnets.

13. The wind turbine with the adaptive nacelle of claim 12, wherein:
    said plurality of magnets are attached to said cylindrical base with a bonding substance.

14. The wind turbine with the adaptive nacelle of claim 12, wherein:
    a lengthwise axis of said at least one generator magnetic gear and said two intermediate driven magnetic gears are parallel to a lengthwise axis of said geared blade shaft.

* * * * *